US009418075B2

(12) United States Patent
Jones et al.

(10) Patent No.: US 9,418,075 B2
(45) Date of Patent: Aug. 16, 2016

(54) AUTOMATIC META-NEIGHBORHOOD AND ANNOTATION GENERATION FOR MAPS

(71) Applicants: Jonah Jones, San Francisco, CA (US); Bernhard Seefeld, San Francisco, CA (US); Taj J. Campbell, San Francisco, CA (US)

(72) Inventors: Jonah Jones, San Francisco, CA (US); Bernhard Seefeld, San Francisco, CA (US); Taj J. Campbell, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 765 days.

(21) Appl. No.: 13/741,961

(22) Filed: Jan. 15, 2013

(65) Prior Publication Data

US 2015/0186414 A1  Jul. 2, 2015

Related U.S. Application Data

(60) Provisional application No. 61/673,093, filed on Jul. 18, 2012.

(51) Int. Cl.
*G06F 17/30* (2006.01)

(52) U.S. Cl.
CPC .................. *G06F 17/30241* (2013.01)

(58) Field of Classification Search
CPC ............. G06F 17/3087; G06F 17/30241
USPC .................................. 707/724, 919
See application file for complete search history.

(56) References Cited

U.S. PATENT DOCUMENTS

| 7,751,971 | B2 * | 7/2010 | Chang | G01C 21/30 340/686.1 |
| 8,037,166 | B2 * | 10/2011 | Seefeld | G06F 17/3087 707/723 |
| 8,484,199 | B1 * | 7/2013 | Katragadda | G06F 17/30241 701/426 |
| 8,959,098 | B2 * | 2/2015 | Skibiski | G06Q 30/02 455/404.2 |
| 2008/0010605 | A1 * | 1/2008 | Frank | G06F 17/30241 715/765 |
| 2010/0161215 | A1 | 6/2010 | Karani | |
| 2011/0063301 | A1 * | 3/2011 | Setlur | G06T 17/05 345/441 |

(Continued)

FOREIGN PATENT DOCUMENTS

EP  1 433 132 B1  6/2004

OTHER PUBLICATIONS

Grabler, Floraine, et al. "Automatic Generation of Tourist Maps," ACM Transactions on Graphics, vol. 27, No. 3, Article 100, Aug. 2008, pp. 1-11.*

(Continued)

*Primary Examiner* — Robert Beausoliel, Jr.
*Assistant Examiner* — Alexandria Bromell
(74) *Attorney, Agent, or Firm* — Marshall, Gerstein & Borun LLP

(57) ABSTRACT

A graphics or image rendering system, such as a map image rendering system, may mark areas of interest on a map based on metadata associated with one or more features of the map. Additional map features may be created to mark the areas of interest or styles of existing map features may be modified to mark the areas of interest.

31 Claims, 7 Drawing Sheets

(56) References Cited

U.S. PATENT DOCUMENTS

| | | | |
|---|---|---|---|
| 2011/0082644 A1* | 4/2011 | Imasaka | A01K 97/00 701/494 |
| 2011/0295849 A1* | 12/2011 | Kobayashi | G06F 17/30775 707/724 |
| 2013/0093787 A1* | 4/2013 | Fulks | G06T 11/60 345/629 |
| 2013/0321257 A1* | 12/2013 | Moore | G06F 3/0481 345/156 |
| 2013/0321422 A1* | 12/2013 | Pahwa | G06T 11/203 345/428 |
| 2014/0074854 A1* | 3/2014 | Gonzalez | G06F 17/30241 707/743 |
| 2014/0278063 A1* | 9/2014 | Beyeler | G01C 21/3682 701/426 |

OTHER PUBLICATIONS

Grabler et al., "Automatic Generation of Tourist Maps," (2008).
Kopf et al., "Automatic Generation of Destination Maps," (2010).

* cited by examiner

|  | Attribute | Object Type | Location | | |
|---|---|---|---|---|---|
|  |  |  | X | Y | Z |
| 0 | Style 1 | Road | 14 | 56 | 24 |
| 1 | Style 1 | Road | 14 | 22 | 19 |
| 2 | Style 1 | Road | 18 | 72 | 44 |
| 3 | Style 2 | Area | 19 | 13 | 23 |
| ⋮ | ⋮ | ⋮ | ⋮ | ⋮ | ⋮ |
| 97 | Style 14 | Text Box | 56 | 12 | 31 |
| 98 | Style 14 | Text Box | 56 | 44 | 28 |

Vertex Data Point #

FIG. 3A

Style #

| | 0 | 1 | 2 | 3 | 4 | ... | N |
|---|---|---|---|---|---|---|---|
| 1 | 28 | 62 | 97 | 44 | 16 | | 13 |
| 2 | 7 | 42 | 43 | 12 | 18 | | 11 |
| 3 | . | . | . | . | . | | 9 |
| 4 | . | . | . | . | . | | 7 |
| ⋮ | | | | | | . . . . . . . . . . . . | |
| 15 | . | . | . | . | . | | . |

Vertex Attribute #

FIG. 3B

| Style | Fill Color | Thickness | Shadow | Brightness |
|---|---|---|---|---|
| Style 1 | Black 231 | 2.3 | NO | 130 |
| Style 2 | Blue 145 | 3.1 | YES | 90 |
| ... | ... | ... | ... | ... |

FIG. 3C

| Map Feature | Metadata 1(Label) | Metadata 2 | Metadata 3 |
|---|---|---|---|
| Area 1021043 | Sydney Exhibition Center | Conference Center | Conference Center |
| Road 943832 | Oxford Street | ...boutique shopping ... | ...boutique shopping ... |
| Road 443499 | Highway 1 | NA | NA |
| | | | |

FIG. 5

| Map Feature | Metadata 1(Label) | Metadata 2 | Metadata 3 | Category ID |
|---|---|---|---|---|
| Location 1 | Restaurant | ...Angus beef burgers are... | ...juiciest burgers in town... | RST01 |
| Location 2 | Restaurant | ...BBQ burgers are great at this ... | ...Wagyu beef burgers ... | RST01 |
| Location 3 | Handbag store | ...the best retail handbags in town... | ...my favorite leather handbags... | RST71 |

FIG. 6

| Map Feature ID | Rank | Style | Prominence |
|---|---|---|---|
| Road 451233A | 1 | Style 1 | 0.5 |
| Road 451234A | 2 | Style 2 | 1.2 |
| Road 45123YA | 2 | Style 3 | 1.2 |
| Area 452439A | 4 | Style 4 | 4.7 |
| Area 451232Z | 5 | Style 5 | 5.1 |

FIG. 8

AUTOMATIC META-NEIGHBORHOOD AND ANNOTATION GENERATION FOR MAPS

CROSS-REFERENCE TO RELATED APPLICATION

The benefit under 35 U.S.C. §119(e) of U.S. Provisional Patent Application No. 61/673,093, filed Jul. 18, 2012, is hereby claimed, and the disclosure is incorporated herein by reference.

FIELD OF TECHNOLOGY

The present disclosure relates to electronic map systems, and more specifically to a mapping system that marks areas of a digital map based on retrieved metadata.

BACKGROUND

A digital map is generally stored in a map database as a set of raw data corresponding to millions of streets and intersections and other map features to be displayed as part of a map. Generally speaking, map features may include, for example, individual roads, text labels (e.g., map labels or street labels), areas, text boxes, buildings, points of interest markers, terrain features, bike paths, etc. The raw map data may be configured to prioritize map features primarily based on navigation. For example, existing maps may emphasize highways over streets, streets over alleys, and roads, in general, over other features of the map. In other words, existing map systems may render map features so that the displayed map most efficiently conveys to a map user how to navigate from an origin to a known destination.

However, the existing methods of displaying map features based on navigation may be less useful to a casual visitor of a city or a neighborhood, where the visitor does not have a particular destination in mind and the visitor may be interested in learning about points of interests or neighborhoods of interest.

SUMMARY

A computer-implemented method for providing map data to a computing device retrieves a plurality of map features for a map viewing window, wherein each of the plurality of map features has at least one associated metadata parameter, and wherein the metadata parameter includes text describing the map feature. The method searches the metadata parameters associated with each of the set of map features for a first keyword that is common between a first set of the map features and a second keyword that is common between a second set of the map features. The method categorizes the first set of map features into a first category of interest and categorizes the second set of map features into a second category of interest by associating a first and a second category identifier to the first and the second set of map features, respectively. The method determines a first area of the map viewing window where the density of map features that belong to the first category are above a first threshold density and determines a second area of the map viewing window where the density of map features that belong to the second category are above a second threshold density. The method ranks the first and the second areas based on a density of the map features of the first category within the first area and a density of the map features of the second category within the second area. The method assigns a first modified style to the first area and a second modified style to the second area, wherein the first and the second modified style is assigned based on a prominence rating of the first and of the second modified style. The prominence rating increases with increasing modified rank. The method provides access to map data, where the map data includes the first and the second area and the first and the second modified styles.

In an embodiment, a computer-implemented method for providing map data to a computing device receives a set of metadata parameters associated with a set of map features for a map viewing window, wherein each of the set of map features has at least one associated metadata parameter of the set of metadata parameters. The method searches the set of metadata parameters of each of the set of map features for a keyword that is common between a plurality of the map features. The method categorizes the plurality of map features having associated metadata parameters with the common keyword into a first category of interest, wherein categorizing the plurality of map features includes associating a first category identifier with the map features belonging to the first category of interest. The method determines a first area of the map viewing window where the density of map features that belong to the first category of interest is over a threshold density. The method creates a mark of the first area. The method provides access to map data including the mark and the determined first area.

In another embodiment, a computer device includes a communications network interface, one or more processors, one or more memories coupled to the one or more processors and a display device coupled to the one or more processors. The one or more memories include computer executable instructions that are executed on the processor to retrieve a plurality of map features for a map area, wherein each of the map features has at least one associated metadata parameter, wherein the metadata parameter includes text describing the map feature. The computer executable instructions are executed to search the metadata parameters associated with each of the set of map features for a first keyword that is common between a first set of the map features. The computer executable instructions are executed to categorize the first set of map features into a first category of interest by associating a first category identifier with each of the first set of map features. The computer executable instructions are executed to determine a first area of the map area where the density of map features that belong to the first category is above a first threshold density. The computer executable instructions are executed to rank the first area based on a density of the map features of the first category within the first area. The computer executable instructions are executed to assign a first modified style to the first area based on a prominence rating of the first modified style, wherein the prominence rating increases with increasing modified rank. The computer executable instructions are executed to provide access to map data that includes the first area and the first modified style

BRIEF DESCRIPTION OF THE DRAWINGS

FIG. 3A is a data diagram illustrating a set of vector data in the form of vertex data points encoded using a vertex style parameter, according to an embodiment.

FIG. 3B is a style lookup table that defines vertex display attribute values for each of a number of different styles and which may be used in the image rendering engine of FIG. 2 to resolve vertex style attributes based on a style reference identifier, according to an embodiment.

FIG. 3C illustrates a more detailed style lookup table indicating types of display attributes for a style.

FIG. 5 illustrates a data diagram in which a map feature parameter is associated with a set of metadata parameters.

FIG. 6 illustrates a data diagram in which a map feature may be associated with a category of interest using a category identifier.

FIG. 8 illustrates a data diagram associating a map feature with a rank, a style, and a prominence.

DETAILED DESCRIPTION

Generally, the claimed mapping method and mapping application or device retrieves metadata associated with a set of map features for a particular viewing window, where the viewing window may be defined as a displayable area of a map surface on a display device at a given zoom level or magnification. The set of map features may be organized into one or more categories of interest based on whether the map features' associated metadata describes the map features in a similar manner. In particular, the method and system may search through each of the set of map features' associated metadata to determine common keywords or phrases within the metadata that describe the associated map features. When two or more map features have common descriptions (contained in their associated metadata), the two or more map features may be placed in the same category of interest. The claimed method and system may determine an area of the map where there is a high density of map features in the same category of interest (also described herein as "features of interest"). The claimed method and system may implement one or more processes to mark, highlight, or otherwise distinguish the determined areas on the map. In an embodiment, a mark may be created to identify the area based on the common keywords. In an embodiment, a style of at least one of the map features in the determined area may be modified to indicate the category of interest. In an embodiment, modifying the style of the at least one map feature may include creating or assigning a mark or a label to a map feature within the determined area. In an embodiment, certain map features such as roads and streets may be re-ranked and/or restyled based on a density of map features of interest.

Figure 1:
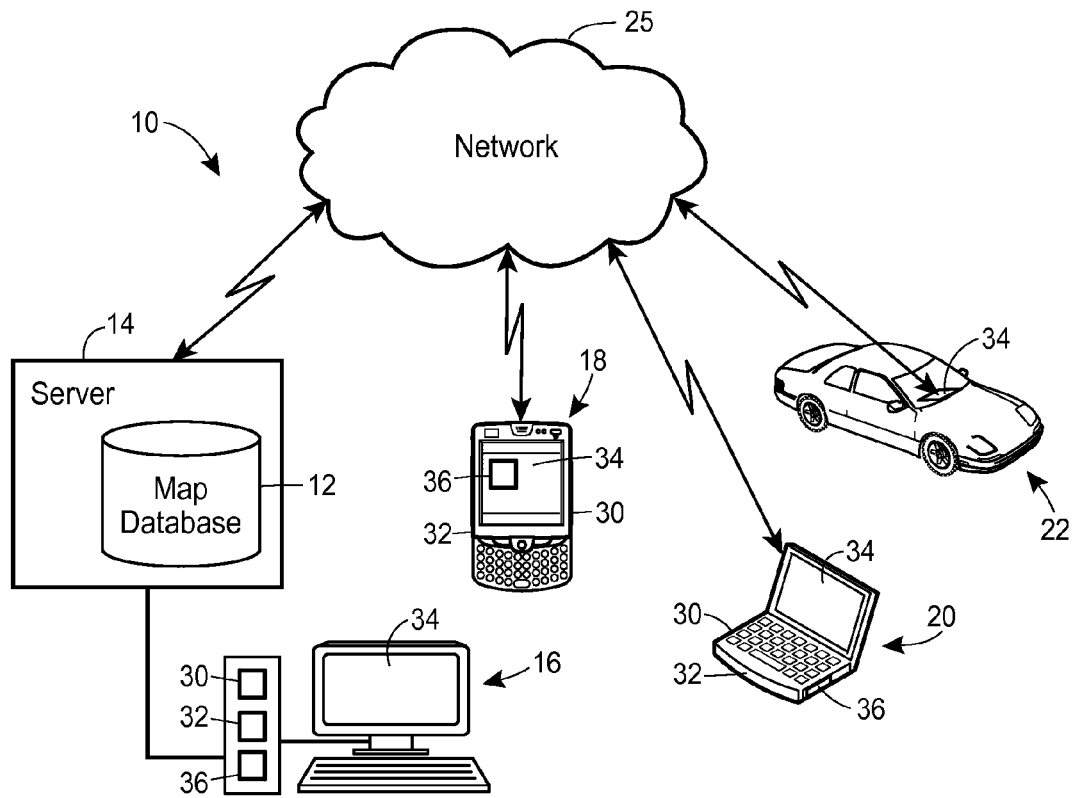
FIG. 1 is a high-level block diagram of a map imaging system that implements communications between a map database stored in a server and one or more map image rendering devices, according to an embodiment.

Referring now to FIG. 1, a map-related imaging system 10, according to an embodiment, includes a map database 12 stored in a server 14 or in multiple servers located at, for example, a central site or at various different spaced apart sites, and also includes multiple map client devices 16, 18, 20, and 22, each of which stores and implements a map rendering device or a map rendering engine. The map client devices 16-22 may be connected to the server 14 via any hardwired or wireless communication network 25, including for example a hardwired or wireless local area network (LAN), metropolitan area network (MAN) or wide area network (WAN), the Internet, or any combination thereof. The map client devices 16-22 may be, for example, mobile phone devices (18), computers such a laptop, tablet, desktop or other suitable types of computers (16, 20) or components of other imaging systems such as components of automobile navigation systems (22), etc. Moreover, the client devices 16-22 may be communicatively connected to the server 14 via any suitable communication system, such as any publically available and/or privately owned communication network, including those that use hardwired based communication structure, such as telephone and cable hardware, and/or wireless communication structure, such as wireless communication networks, including for example, wireless LANs and WANs, satellite and cellular phone communication systems, etc.

The map database 12 may store any desired types or kinds of map data including raster image map data (e.g., bitmaps) and vector image map data. However, the image rendering systems described herein may be best suited for use with vector image data which defines or includes a series of vertices or vertex data points for each of numerous sets of image objects, elements or primitives within an image to be displayed. Generally speaking, each of the image objects defined by the vector data will have a plurality of vertices associated therewith and these vertices will be used to display a map related image object to a user via one or more of the client devices 16-22. As will also be understood, each of the client devices 16-22 includes an image rendering engine having one or more processors 30, one or more memories 32, a display device 34, and in many cases a rasterizer or graphics card 36 which are generally programmed and interconnected in known manners to implement or to render graphics (images) on the associated display device 34. The display device 34 for any particular client device 16-22 may be any type of electronic display device such as a liquid crystal display (LCD), a light emitting diode (LED) display, a plasma display, a cathode ray tube (CRT) display, or any other type of known or suitable electronic display.

Generally, speaking, the map-related imaging system 10 of FIG. 1 operates such that a user, at one of the client devices 16-22, opens or executes a map application (not shown in FIG. 1) that operates to communicate with and obtain map information or map related data from the map database 12 via the server 14. The map application may then display or render a map image based on the received map data. The map application may allow the user to view different geographical portions of the map data stored in the map database 12, to zoom in on or zoom out of a particular geographical location, to rotate, spin or change the two-dimensional or three-dimensional viewing angle of the map being displayed, etc. More particularly, when rendering a map image on a display device or a display screen 34 using the system described below, each of the client devices 16-22 downloads map data in the form of vector data from the map database 12 and processes that vector data using one or more image shaders to render an image on the associated display device 34.

Figure 2:
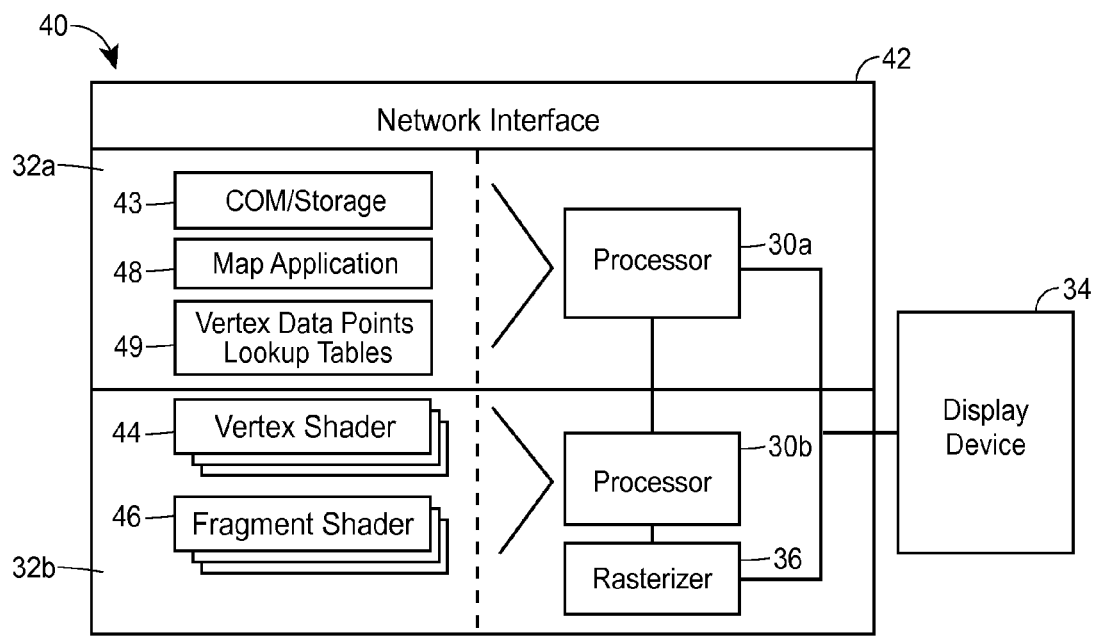
FIG. 2 is a high level block diagram of an image rendering engine used to render map images using map vector data, according to an embodiment.

Referring now to FIG. 2, an image generation or imaging rendering device 40, according to an embodiment, associated with or implemented by one of the client devices 16-22 is illustrated in more detail. The image rendering system 40 of FIG. 2 includes two processors 30a and 30b, two memories 32a and 32b, a user interface 34 and a rasterizer 36. In this case, the processor 30b, the memory 32b and the rasterizer 36 are disposed on a separate graphics card (denoted below the horizontal line), although this need not be the case in all embodiments. For example, in other embodiments, a single processor may be used instead. In addition, the image rendering system 40 includes a network interface 42, a communications and storage routine 43 and one more map applications 48 having map display logic therein stored on the memory 32a, which may be executed on the processor 30a (e.g., which may be a central processing unit (CPU)). Likewise one or more image shaders in the form of, for example, vertex shaders 44 and fragment shaders 46 are stored on the memory 32b and are executed on the processor 30b. The memories 32a and 32b may include either or both volatile and non-volatile memory and the routines and shaders are executed on the processors 30a and 30b to provide the functionality described below. The network interface 42 includes any well known software and/or hardware components that operate to communicate with, for example, the server 14 of FIG. 1 via a hardwired or wireless communications network to obtain image data in the form of vector data for use in creating an image display on the user interface or display device 34. The image rendering device 40 also includes a data memory 49, which may be a buffer or volatile memory for example, that stores vector data received from the map database 12, the vector data including any number of vertex data points and one or more lookup tables as will be described in more detail.

During operation, the map logic of the map application 48 executes on the processor 30 to determine the particular image data needed for display to a user via the display device 34 using, for example, user input, GPS signals, pre-stored logic or programming, etc. The display or map logic of the application 48 interacts with the map database 12, using the communications routine 43. The application communicates with the server 14 through the network interface 42 to obtain map data, preferably in the form of vector data or compressed vector data from the map database 12. This vector data is returned via the network interface 42 and may be decompressed and stored in the data memory 49 by the routine 43. In particular, the data downloaded from the map database 12 may be a compact, structured, or otherwise optimized version of the ultimate vector data to be used, and the map application 48 may operate to transform the downloaded vector data into specific vertex data points using the processor 30a. In one embodiment, the image data sent from the server 14 includes vector data generally defining data for each of a set of vertices associated with a number of different image elements or image objects to be displayed on the screen 34 and possibly one or more lookup tables which will be described in more detail below. If desired, the lookup tables may be sent in, or may be decoded to be in, or may be generated by the map application 48 to be in the form of vector texture maps which are known types of data files typically defining a particular texture or color field (pixel values) to be displayed as part of an image created using vector graphics. More particularly, the vector data for each image element or image object may include multiple vertices associated with one or more triangles making up the particular element or object of an image. Each such triangle includes three vertices (defined by vertex data points) and each vertex data point has vertex data associated therewith. In one embodiment, each vertex data point includes vertex location data defining a two-dimensional or a three-dimensional position or location of the vertex in a reference or virtual space, as well as an attribute reference. Each vertex data point may additionally include other information, such as an object type identifier that identifies the type of image object with which the vertex data point is associated. The attribute reference, referred to herein as a style reference or as a feature reference, references or points to a location or a set of locations in one or more of the lookup tables downloaded and stored in the data memory 43.

FIG. 3A illustrates an embodiment of map data that may be sent to a client device, such as device 40 of FIG. 2, for processing, according to an embodiment. As FIG. 3A illustrates, map data contains location data for a vertex, an object type, and a style attribute(s) for the vertex. A set of one or more of the vertices may comprise an image object or feature of a map, such as a road or a building. The style attributes may be sent for each vertex or may reference a style look up table such as that illustrated in FIG. 3B or 3C that can be used to decode a style reference or identifier from FIG. 3A into a complete set of one or more style attribute parameters or display parameters, according to an embodiment.

Style parameters may include a fill color (e.g., for area objects), an outline color, an outline width, an outline dashing pattern and an indication of whether to use rounded end caps (e.g., for road objects), an interior color, an interior width, an interior dashing pattern, and interior rounded end caps (e.g., for road objects), a text color and a text outline color (e.g., for text objects), an arrow color, an arrow width, an arrow dashing pattern (e.g., for arrow objects), a text box fill color and a set of text box outline properties (e.g., for text box objects) to name but a few. Of course, different ones of the vertex style attributes or display parameters provided may be applicable or relevant to only a subset of image objects and thus the vertex style data points associated with a particular type of image object (e.g., a map feature) may only refer to a subset of the vertex attributes listed for each style.

FIG. 3C illustrates a table associating a style identifier with a set of display attributes. This table is similar to the table of FIG. 3B except that examples of particular style attribute values are described (e.g., color, thickness, labeling). It should be noted that FIG. 3C displays only some example values of display attributes that can be assigned or associated with a style. The table of FIG. 3C generally illustrates that a style (represented by a style identifier) may be defined as a set of display attributes or parameters, where each display parameter has a value. A style may be changed or modified by changing a value of a display parameter that is associated with the style and/or by changing the display attributes of the style. For example, the style may be changed by removing display attributes previously associated with a style identifier or associating additional display attributes with the style identifier. In an embodiment, only existing styles that already have been created and stored in a table may be assigned to map features. In this manner, the assignment of styles may be performed by re-assigning existing style identifiers already contained, e.g., in a map database. The use of existing styles may be applicable in map rendering systems that are difficult to modify. Alternatively, a set of style parameters that is different and distinct from any styles existing in a map database may be assigned to the map features. As discussed, new styles may be created by modifying existing display parameters or attributes of existing styles or creating new sets of display parameters and attributes. Using a different and distinct set of new styles may establish a more significant distinction in the rendering of map features.

Figure 4:
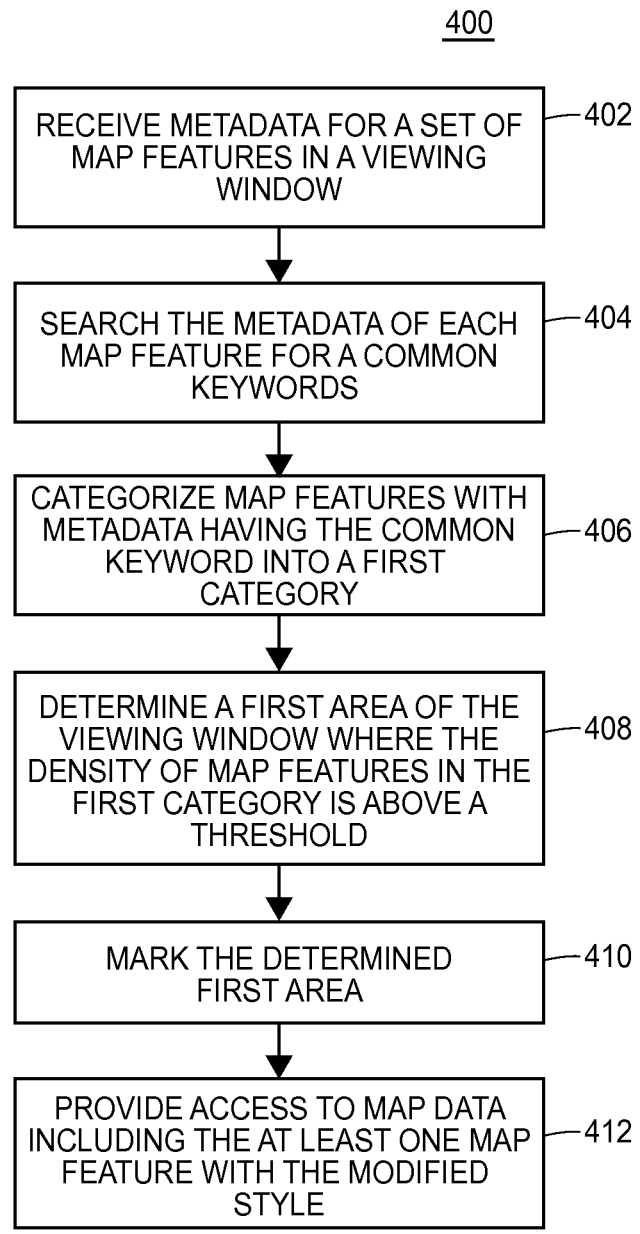
FIG. 4 illustrates a process flow diagram or flow chart of a method, routine, or process that may be used to determine areas of interest or features of interest on a map based on metadata, according to an embodiment.

FIG. 4 illustrates a process flow diagram or flow chart of a method, routine, or process 400 that may be used to determine areas of interest or features of interest on a map based on metadata, according to an embodiment. A block 402 may retrieve metadata for a set of map features. A block 404 may search through each map feature's associated metadata parameters for a common keyword or key phrase. A block 406 may then take the search results from the process of the block 404 and categorize the set of map features based on whether two or more map features have metadata that have similar descriptions (e.g., similar keywords or key phrases) of their respective map features. A block 408 may then determine a first area of the map viewing window where the density of map features belonging to a first category is over a threshold density. A block 410 may then mark the first area. A block 412 may provide access to map data that includes the marked first area.

Generally, metadata is defined to be data describing data. Metadata may represent information about entities (e.g., map features), and relationships between those entities or map features. A plurality of different metadata may be used to describe various map features for a particular area of a map (e.g., as defined by a viewing window). For example, given a map feature such as a point location, metadata on the point location may include information that describes a category or type of the location (e.g., restaurant, theater, retail store, etc.), a name of the point location, a review of the point location (by users), a rating of the point location, a coordinate(s) of the point location, a descriptive label or symbol of the point location, etc., just to name a few. Metadata of a map feature may include any parameter that describes the map feature, including other map features (e.g., labels) that are associated with or related to the map feature. Where metadata is available for a set of map features, the set of map features may be organized based on the information in the metadata to enable rendering of the map features from a point of interest perspective rather than a navigational perspective.

Generally, the block 402 may retrieve metadata on the set of map features from a number of sources. In an embodiment, metadata may be included with map feature data. For example, a label associated with a map feature may provide at least a name or a short description of the map feature. More detailed labels may include additional information such as an address or other contact information (e.g., for a business). In some mapping systems, certain map features may have place page data. Place page data may be a data store such as a web page that contains additional information on a particular map feature. Place page data may be accessed from a displayed electronic map via a reference or a link to the data store. For example, selecting a map feature such as a location on a displayed map may initiate a web request to render a place page on a client device to provide additional detail about the location. Reviews of a particular map feature such as a point location or neighborhood may also be available via the place page data. The reviews may be captured from user input during an interactive map rendering session. For example, some existing mapping systems may include place page entry screens where a user viewing a place page may edit or add information to the place page data. This may include writing an opinion or a review of the map feature associated with the place page. This may also include, among many additional parameters, assigning a rating to the map feature or a characteristic of the map feature (e.g., a number of stars indicating an approval rating).

In an embodiment, reviews or other information may be retrieved from external third party applications or third party data stores. For example, external data feeds may be processed to retrieve information about locations or other map features. The retrieved data may then be broken down into metadata parameters for use with the methods described herein. In an embodiment, reviews and links from external data stores may be included or integrated with place page data. For example, a user may input a link into a place page that provides additional information on a map feature. The mapping application may be configured to initiate the link to retrieve or import additional metadata on the map feature from the link source.

In an embodiment, opening a place page may include recording a selection or initiation of the place page by a user. This may be referred to as "checking in." In an embodiment, "checking in" to a location may include selecting a particular map feature on a viewing window or otherwise selecting a map feature by performing a search for the map feature via a category search or an address search (e.g., where a user initiates a search for a particular name of a restaurant). In any case, the system 10 may automatically record opening the place page data or accessing the place page data with the place page information. The process of "checking in" may thus represent additional metadata that may be used with the method and system described herein.

As discussed, metadata sources may include labels or other parameters that are internal to the mapping application as well as external data feeds that are analyzed for metadata content. All metadata sources may be associated with one or more map features for a viewing window of a map surface. Accordingly, block 402 may retrieve metadata from both a map database that is internal to an existing map rendering application or may import metadata from external third party sources. Generally, a third party source may be defined as any data store that is operated or owned by an entity distinct (e.g., legally distinct and/or physically distinct) from an entity that operates or owns the mapping application described herein.

The block 402 may receive metadata from external sources in that may not be initially assigned to a map feature but only contains content describing a map feature. In this case, the block 402 may include processing the non-linked metadata and associating the metadata with a corresponding map feature. For example, when the block 402 retrieves metadata from an external source, the metadata may describe one or more point locations or may describe one or more characteristics of the one or more point locations (e.g., if the location is a business the metadata may described details of services offered by the business). The block 402 may determine which metadata belongs to each of a set of map features and associate the metadata with the corresponding map features. For example, the block 402 may retrieve metadata from a travel site (which may be retrieved from a link on a place page) where the metadata contains information about one or more locations. The process of block 402 may associate the metadata with a map feature for which the metadata content is relevant. Those skilled in the art will understand that a computer application such as that described herein may associate data in a number of ways such as indexing metadata to the map feature. For example, FIG. 5 illustrates a data diagram that associates a map feature parameter with a set of metadata parameters. In an embodiment, a metadata parameter may include a text string that describes an aspect of a map feature that the metadata parameter is associated with. In an embodiment, a single map feature may include multiple metadata parameters. For example, one or more external sources may provide a plurality of distinct text content about a particular location. The block 402 may aggregate all the retrieved metadata parameters and associate the metadata parameters with their corresponding map features.

Similar descriptions between various map features may be identified in block 404 in a number of different manners while remaining within the scope of the claimed method and system. The block 404 may implement various search algorithms to identify keywords and key phrases in the plurality of text included with the retrieved metadata. In an embodiment, the block 404 may perform a search for same words or same phrases with some filtering or bypassing of common grammatical constituents. The block 404 may implement other rules with the search algorithm to tune the search for specific text. In an embodiment, the block 404 may search for a predetermined list of keywords contained within the metadata parameters to ascertain a category of a map feature (such as restaurant, bar, theater, retail store, etc.). The mapping application may automatically generate the list (e.g., from previous search results) or create the list based on user input.

In an embodiment, the block 404 may search for specific words or phrases that are used as category tags for subsequent words or phrases (i.e., metadata on metadata). For example, the metadata retrieved in block 404 may be organized using a markup language such as Hypertext Mark Up Language, or HTML, that has content divided and indexed into particular categories. In this case, the block 404 may simply search through prescribed categories (e.g., HTML, head, title, body, etc.) for common phrases that further describe the map feature within the category. More flexible markup languages (e.g., XML) may be used to specifically categorize map feature data. For example, where metadata on restaurants are category tagged or indexed into sections such as title (name of location), category of location (restaurant), services offered (menu of items served), rating of location, price range of services, etc., the block 404 may search each category tagged section for keywords.

The block 406 may take the search results of the block 404 and categorize the set of map features based on whether two or more map features have metadata that has similar descriptions (e.g., keywords or phrases) of the map features. The block 406 may categorize map features in a number of manners which are familiar to one skilled in the art. In an embodiment, the block 406 may assign or associate a category identifier or a parameter associated with a category to a map feature belonging to the same category. For example, the block 406 may use the data diagram of FIG. 6 to associate a category identifier to a map feature. FIG. 6 illustrates that a first map feature and a second map feature may both be described as serving hamburgers. In this case, the first and the second map features may be placed in the same map feature category (e.g., Burger Restaurants) having a identifier "REST01". The block 406 may categorize other map features in this manner according to an embodiment.

Figure 7:
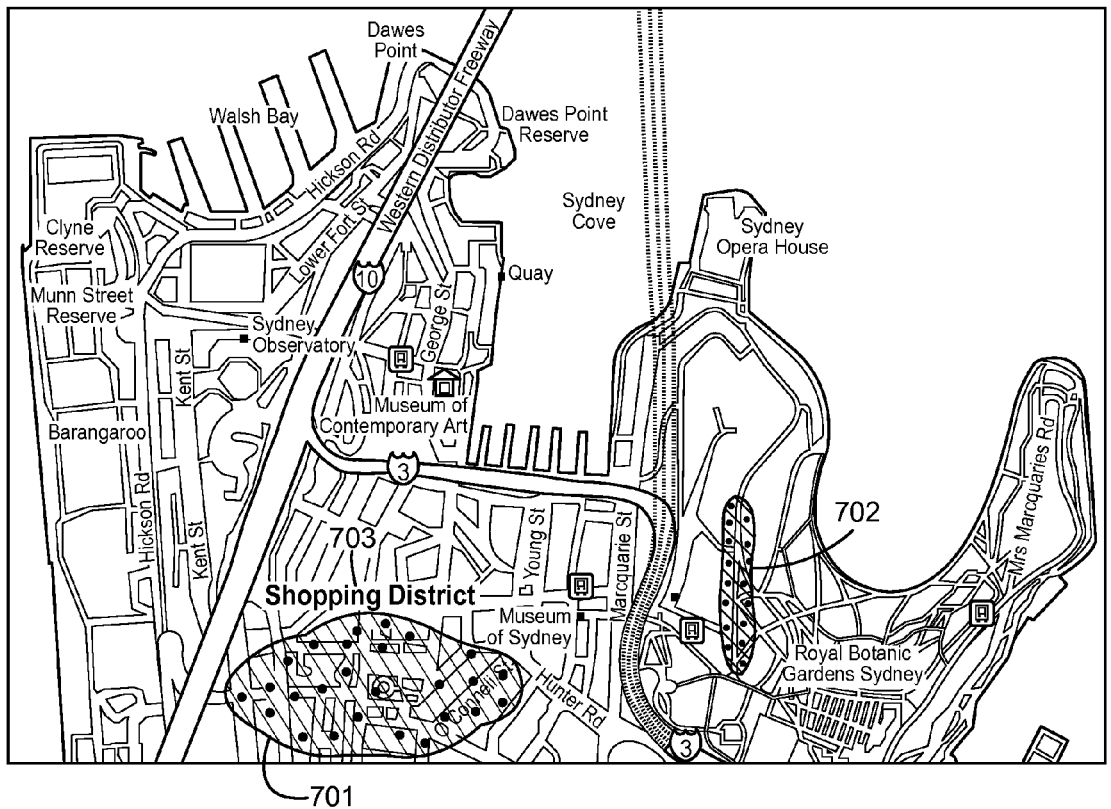
FIG. 7 illustrates a map display having a plurality of point locations belonging to a category of interest.

The block 408 may determine an area of the map viewing window where a spatial density of map features belonging to a category of interest is over a threshold value. Generally, the block 408 may be used to determine areas of a map with high densities of map features belonging to a category of interest. The map features may be referred to herein as "features of interest" and the area having a high density of map features of interest may be referred to as an "area of interest." FIG. 7 illustrates a map having a plurality of point locations belonging to the same category of interest (each one marked by a dot). An area 701 illustrates a density of point locations of a first category of interest that is above a threshold density. The area 701 may be a neighborhood comprising a plurality of streets such as a shopping district. A high density of map features of interest (i.e., belonging to a category of interest) may be concentrated primarily along a particular road. In FIG. 7, the block 408 may determine an area 702 about a road with a high density of point locations belonging to a category of interest, such as a street with a large number of vegetarian restaurants. The phrase "about a road" may mean accessible from a road, and thus, the term "about a road" may include points of interest that may be disposed offset from the road but accessible from the road. In an embodiment, an area about a road may be an area within a diameter of a road. While FIG. 7 illustrates highlighting an area within a diameter of the road (702), where the block 410 may mark the road in a number of different ways. For example, the block 410 may modify the thickness or the color of the road may instead.

The block 408 may determine a threshold density based on a number of parameters. In an embodiment, the block 408 may base the threshold density of map features for a category of interest on a user input. The user input may include a user's mode of transportation. For example, a casual visitor may be using public transportation or may be on foot. The block 408 may set the threshold density to two or more map features of interest per mile. If the visitor is using a car, for example, the block 408 may set the threshold density to two or more map features of interest per 5 miles, for example. In an embodiment, the block 408 may set the threshold density to a default value. In an embodiment, the block 408 may set the threshold density based on user input and automatically adjusted the threshold density based on the user input. In an embodiment, the block 408 may set the threshold density based on a zoom level. The block 408 may reduce the threshold density (e.g., lower number of map features per unit area) for lower zoom levels to encompass a greater area of the viewing window, and vice versa. In an embodiment, the block 408 may set the threshold density based on the category of interest. The category of interest may include map features that are rare and the block 408 may set the threshold density low to highlight areas of a map where even the existence of a few map features in the category of interest would be important to a map user. In an embodiment, the threshold density may be provided to or received by the block 408 by an external process instead of the block 408 determining the threshold density.

The block 410 may create a mark of the first area. Creating a mark of the first area may include any process that distinguishes the first area from other areas of the map. Marking the first area may include creating a map feature corresponding to the first area or modifying a style of a map feature within the first area. In an embodiment, creating a mark of the first area may include creating an area map feature that corresponds to the first area, such as the shaded areas 701 and 702. The area feature may outline or otherwise highlight an actual area on the map using, for example, a contrasting shade, tint, or color. In an embodiment, creating the mark of the first area may include creating an annotation and disposing the annotation about the determined area of interest, such as label 703. The annotation may indicate the first area and associate the annotation with the first area. The block 410 may create an annotation by modifying a label associated with a map feature in the first area, where the map feature may be one of the map features within the category of interest that defines or characterizes the area. In an embodiment, a label may be part of a style that belongs to a map feature of the determined area of interest. In this case, modifying the label may amount to a change in the style associated with the map feature of the determined area of interest. For example, a general restaurant may include a label with a generic restaurant symbol. When the claimed method and system determines that a restaurant that is labeled with the generic restaurant symbol is a café (a determined category of interest) and is located among a plurality of café s in a high density area, the general restaurant symbol (e.g., a knife and fork symbol) may be changed to a symbol indicating café s (e.g., a cup and saucer symbol).

As discussed, marking the first area may involve assigning or modifying a style parameter to a map feature within the first area. Generally, the block 410 may execute an instruction to modify the style of one or more map features within the first area to distinguish the first area from other areas of the map. Referring to FIG. 7, the area of high density 701 may have some or all the map features in the area colored or shaded differently than a default or previous color assigned to those map features. This process of restyling some or all the map features may be a separate and distinct process from creating a map feature that corresponds to an area of the map as discussed above. Of course, in an embodiment, the block 410 may create of the area map feature as well as re-style one or more map features within the first area.

In an embodiment, the block 410 may rank or re-rank map features based on their respective metadata. Generally, ranking a map feature may include assigning a priority to the map feature. The rank given to a map feature may correspond to a desired degree of prominence for rendering the map feature. A mapping application may store style parameters that are indexed by a prominence or prominence rating. The block 410 may assign a style having a corresponding degree of prominence to the map feature based on the rank of the map feature.

FIG. 8 illustrates a data diagram associating a map feature with a style and a rank. Generally, map data may not include a rank parameter. However, the lack of an associated rank parameter may not necessarily mean that map features of the map data do not contain a prioritization. In some rendering systems, a default ranking may be inherent in the manner in which map features are displayed. For example, a mapping application may render certain types or categories of map features using a first style having a first degree of prominence, while other types or categories of map features may be rendered using a second style having a different degree of prominence. In this situation, a default ranking may exist based on the display schema of the rendering system. For example, in existing navigation focused maps, large highways may be rendered as thicker lines with a more prominent color shading, while smaller streets are rendered using thinner lines and less prominent color shading. In this manner, a default ranking of map features may exist where the highways are ranked higher than the smaller streets. In the described method and system, map features may be associated with a modified style parameter based on metadata. If the map features already include rank parameters, the existing rank parameters may be modified to reflect a new priority based on the metadata.

FIG. 8 also illustrates that a style parameter (denoted Style 1, Style 2, Style 3, etc.) may be associated with a prominence rating, indicating a degree of prominence. Generally, style parameters may be used to distinguish different ranked features via a difference in display prominence (e.g., contrast). In an embodiment, the block 410 or other process may determine the prominence rating based on a number of different factors. The prominence rating may generally indicate a degree of visual difference between styles. In some embodiments, a user may determine the prominence assignments manually, whereby the rank of the styles in FIG. 8 may be input by the user. For example, a map application implementing the described method may allow a user to determine how certain map features are to be drawn (e.g., how a color or a shade of an area of interest is to be displayed). In some embodiments, the block 410 or other process may determine the prominence rating based on differences in measurable values of certain display parameters. For example, the block 410 or other process may calculate the prominence rating based on a degree of brightness of a style, a degree of color of a style, a size of a style, or any combination of these or other factors or attribute values. In one embodiment, the block 410 or other process may use an algorithm to calculate an overall prominence level based on a combination of display attribute values. The algorithm may generally assign weights to one or more display parameters and calculate a weighted average of the values of the display parameters to determine a prominence rating of the style.

In some embodiments, the ranking or re-ranking of the map features of block 410 may simply involve assigning a style with a corresponding prominence to the map feature. In other words, the prominence ratings of the style parameters may correspond to a priority order and prioritizing the map features may involve simply assigning a style parameter having a matching priority or prominence to the map feature with respect to other map features. While the block 410 may rank map features by assigning a style (e.g., where a style is pre-mapped to a prominence level), it should be noted that there is a distinction between ranking a map feature and assigning a prominence rating/style to the map feature. A mapping application may perform (e.g., via block 410) both processes separately and independently of each other. However, in embodiments where a mapping application may pre-rank or pre-map styles to a prominence rating, the mapping application (e.g., via block 410) may rank a map feature by relevance to a user context and assign a corresponding style concurrently.

FIG. 8 further may also illustrate a map data structure that may result from re-ranking map features and assigning styles to the map features. In this embodiment, the mapping application may identify the map features using a unique map feature identifier. The mapping application may further categorize map features may of a particular type or category using a similar identifier.

In an embodiment, the block 410 may rank determined areas of interest higher than area features of a map that have map feature densities of interest below the threshold density. FIG. 7 illustrates a basic embodiment in which areas of density of points of interest may be styled using, for example, a shade or color that is distinct from map features outside the areas of density. In an embodiment, a plurality of high density areas of map features of interest may exist within a viewing window of a map. The block 410 may rank map features based on the densities of map features within one or more categories of interest. For example, a first area of a map may have a first density (above the threshold density) of map features belonging to a category of interest such as fast food restaurants and a second area separate from the first area may have a higher density of fast food restaurants. In this case, the block 410 may rank the second area higher than the first area, where the ranking of the area feature is proportional to the density of map features in the area feature.

In an embodiment, a first area may contain a high density of fast food restaurants and a second area may contain a higher density of women's shoes stores. In this case, the mapping application (e.g., via the block 410) may rank one category higher than the other category. The ranking between different types of categories of interest may be predetermined by the mapping application or may be user configured. When the categories are user configured, a listing of the categories may be displayed by the mapping application and a user may rank the categories. In an embodiment, the mapping application may exclusively assign a set of styles to one or more categories of interest to differentiate prominence between map features in different categories of interest. Of course, the mapping application may implement many other combinations of rankings between and within categories of interest while remaining within the scope of the described method and system.

In an embodiment, a popularity of a map feature based on metadata may be used to determine a priority or an importance of the map feature. The block 408 may determine the priority of a particular map feature and in addition determine areas of interest as described above. In particular, the block 408 may determine whether a particular map feature is a point of interest based on a popularity rating of the map feature. The block 408 or other mapping application process may determine the popularity rating based on a total number of metadata parameters associated with the point location. For example, when a large number of metadata (e.g., received from an external source) references the same map feature (e.g., contains information on the map feature), this may indicate that the map feature has a high popularity or is a map feature of interest. In an embodiment, the block 408 or other mapping application may determine the popularity rating based on a number of check-ins to a map feature, where the check-ins may represent a type of metadata. As discussed above, the check ins may be based on user selection of a map feature, a user initiated search for the map feature, access to a place page of the map feature, etc. In an embodiment, the block 408 may determine whether a category of map feature is a priority based on the popularity rating of one or more map features that comprise the category. More particularly, the block 408 may first determine a popularity rating of one or more map features. The block 408 may then determine an area of interest including the popular map features (e.g., map features having a threshold popularity rating).

In an embodiment, the process of determining popularity may be applied to alias descriptions of a map feature. In an embodiment, the block 408 may determine whether certain key words or phrases that are popularly used to described a map feature should be used to re-label or re-style a map feature. For example, a particular street may have an official name (e.g., Wentworth Street) but have a different popular name (e.g., Chinatown Road) which is included in the content of a threshold number of metadata parameters associated with the Wentworth Street map feature. The block 408 may determine an alias for Wentworth street based on the popular, common descriptions that the block 408 has aggregated from a plurality of metadata parameters for the Wentworth Street map feature. The alias may be included in the responsive map data of block 410. In an embodiment, if the popularity of the common description surpasses a threshold popularity rating, the block 408 may replace a label using "Wentworth Street" with the alias "Chinatown Road."

The process blocks 402-410 may be implemented and executed in a single map rendering device that also includes a map database. However, because of the large volume of map data, the described mapping system may be implemented using a client device 16-22 (FIG. 1) and a server device 14, where the server device 14 may primarily perform map data processing and map data storage and provide map data to the client device 16-22 for rendering on a display device 34 of the client device 16-22. In an embodiment, the blocks 2-10 may all implemented at the server 14 and the client device 16-22 may request responsive map data for a portion of a map based on a selected viewing window and a user context (e.g., a user may input a location indicating an area about a location). The server 14 may then implement or execute the blocks 2-10. An additional block 412 may be included in the process to provide access to the responsive map data. Generally, responsive map data may include any combination of the set of map features, marks of the determined area (e.g., a created map feature or a modified style assigned to an existing map feature), and/or information on the densities of the map features of interest. The block 412 may include transmission of the responsive map data to the client device 16-22. Alternatively, the block 412 may simply provide access to a mapping application within a single computing device for rendering the areas of interest or the map features of interest. Of course, various different portions of the blocks 402-412 may be implemented between client and server devices and remain within the scope of the claimed method and system.

Figure 9:
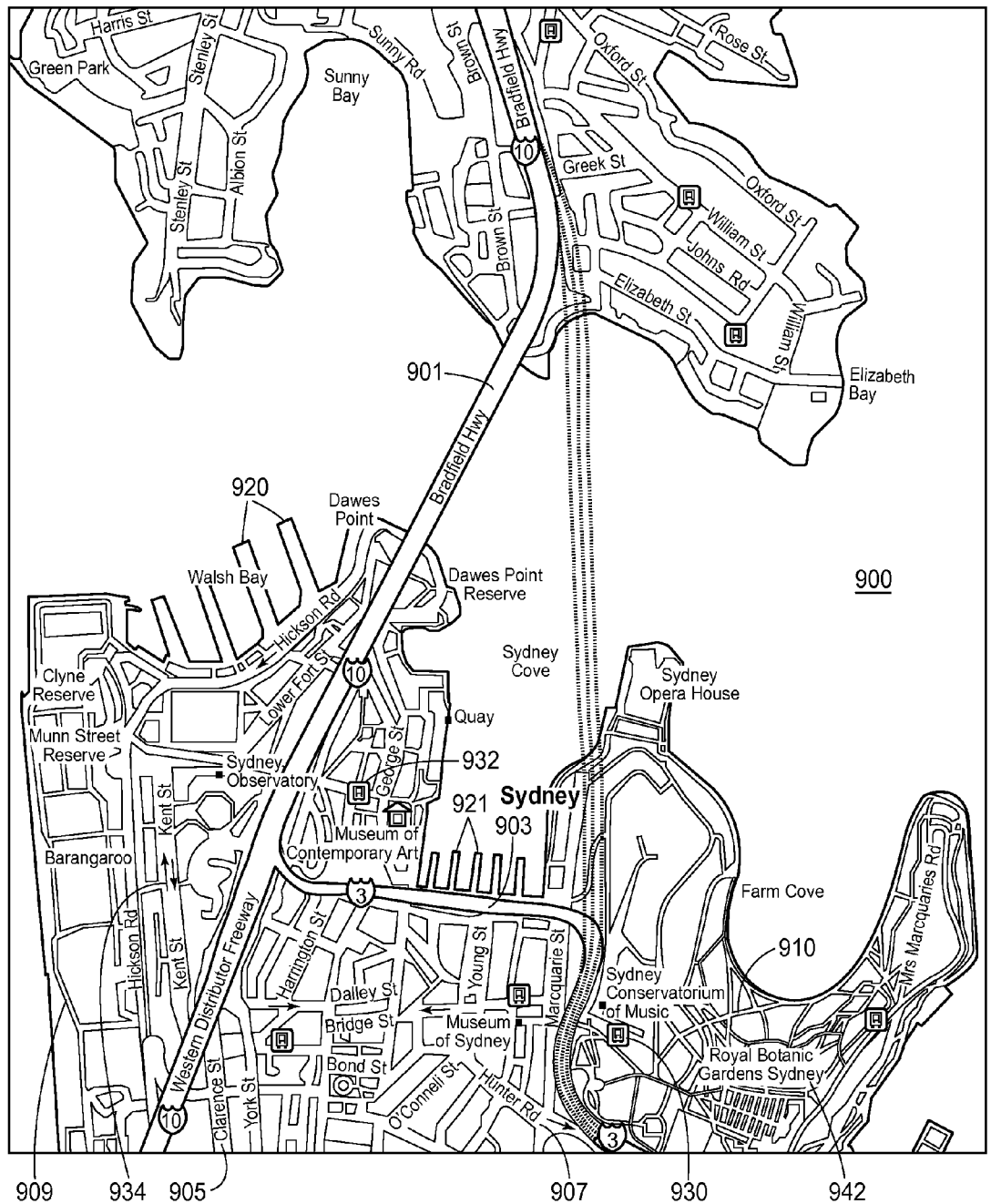
FIG. 9 illustrates an existing map display that is focused on navigation.

FIG. 9 illustrates a map display 900 that may be produced by an existing map rendering system that is focused on navigation. In a map display such as FIG. 9, an existing mapping application may display major arterial roads 901, 903 (such as highways and interstate roads) with high prominence and high detail while smaller side streets 905, 907 are displayed with less prominence and less detail at a single zoom level. FIG. 9 illustrates that some small streets 909, 910 may not even be labeled at a particular single zoom level. Other major navigational features such as shipping ports 921 are also shown with prominence. Other navigational markings such as train 930 and bus stations 932, direction of traffic signs 934, etc. are labeled with prominence in FIG. 9. While FIG. 9 may be adequate for conveying to a user how to reach a destination point when the user already has a known destination, FIG. 9 may limit a user's ability to search for areas of interest when the user is unfamiliar with an area.

Figure 10:
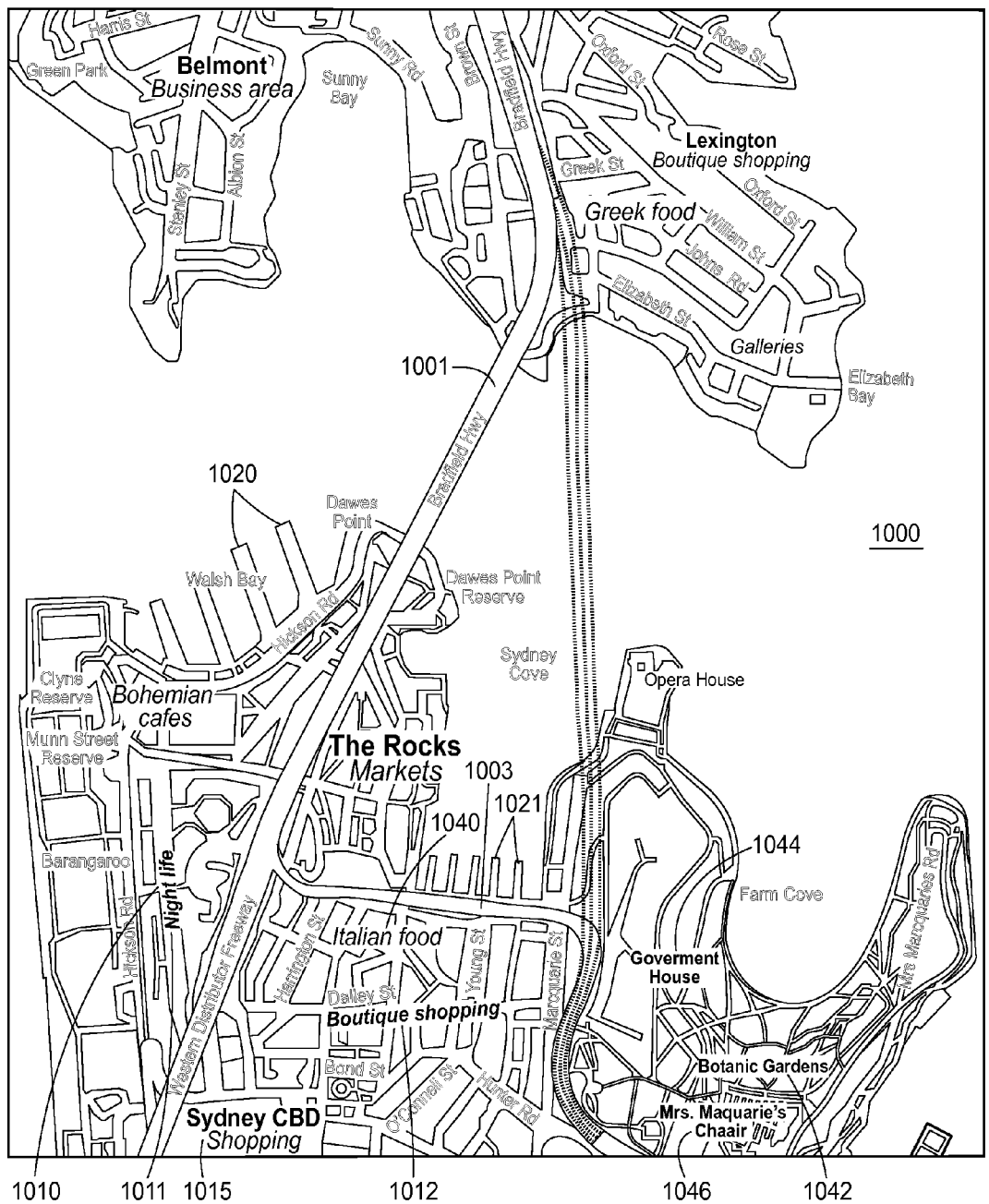
FIG. 10 illustrates a re-ranked and re-styled version of the map of FIG. 9 based on metadata.

FIG. 10 illustrates a re-ranked and re-styled version of the map of FIG. 9, according to an embodiment of the method and system described herein. FIG. 10 illustrates a map area 1000 that major arterial roads such as highways 1001, 1003 that do not contain a high density of map features of interest may be reduced in rank and assigned a style with less prominence compared to the map displayed in FIG. 9. Other navigationally important features of FIG. 9 such as the shipping ports 1020, 1021 may also demoted in rank and rendered with muted (less prominent) colors and shading. Some navigational features may be reduced in rank so that they are not shown at all. For example, train stations and bus stops are no longer labeled in FIG. 10.

The smaller streets 1010, 1012 of FIG. 10 that each carry a high density of map features of interest may be ranked high and assigned corresponding higher prominence styles. Along with the high rank may be additional detail such as labels 1011 or more information per label than FIG. 9. Areas of interest that encompass more than a single street may be rendered differently using, for example, shading or coloring. For example, the Sidney Central Business District (CBD) 1015 is shaded distinctly and additional labels indicating a "shopping" area associated with the area. Another example is the Italian Food area 1040. FIG. 9 merely labels Harrington street while FIG. 10 shades the area around and about Harrington street and provides additional label information indicating that the area is known for Italian food. Another difference between FIGS. 9 and 10 is that FIG. 9 shows official names for particular areas while FIG. 10 may label map features using popular or common names for the map features. For example, FIG. 9 illustrates a map feature 942 labeled as "Royal Botanic Gardens," while FIG. 10 illustrates the same map feature 1042 using a label "Botanic Gardens." Moreover, additional points of interest that are not rendered in FIG. 9 may be rendered in FIG. 10. These points of interest may be determined based on the popularity rating as discuss above. For example, in the Botanical Gardens area, additional map features such as 1044 "Government House" and 1046 "Mrs. Maquarie's Chair" are rendered in FIG. 10 and not in FIG. 9.

The claimed method and system may modify map data so that points of interest and neighborhoods of interest may be rendered with higher prominence to accommodate a map perspective that is easier for a visitor who is unfamiliar with the highlights of an area to determine where to go. The claimed method and system may determine points of interest as well as their ranking based on common metadata parameter values (metadata content) that are obtained from the mapping application and from external data sources. By rendering the map using the processed map data, user-visitors may be able to more efficiently familiarize themselves with the social highlights of a new, unfamiliar location.

It should be noted that the data diagrams or data structures described herein can be readily implemented by those skilled in the art in the form of, for example, database tables, memory pointers associating one or more data parameters, etc. Thus, while the data diagrams are depicted in table form in the figures, those skilled in the art readily understand that the data diagrams can be implemented in any number of ways to organize and manage data in a manner consistent with the techniques described herein.

Any suitable subset of the process blocks described herein may be implemented in any suitable order by a number of different devices (e.g., client or server) and remain consistent with the method and system described herein. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 25 may include but is not limited to any combination of a LAN, a MAN, a WAN, a mobile, a wired or wireless network, a private network, or a virtual private network. Moreover, while only four client devices are illustrated in FIG. 1 to simplify and clarify the description, it is understood that any number of client computers or display devices are supported and can be in communication with the server 14.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map rendering system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for rendering map or other types of images using the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method of providing map data to a computer device comprising:
   retrieving, using a computer device, a plurality of map features for a map viewing window, wherein each of the plurality of map features has at least one associated metadata parameter, wherein the metadata parameter includes text describing the map feature;
   searching, using the computer device, the metadata parameters associated with each of the set of map features for a first keyword that is common between a first set of the map features and a second keyword that is common between a second set of the map features;
   categorizing, using the computer device, the first set of map features into a first category of interest and categorizing the second set of map features into a second category of interest by associating a first and a second category identifier to the first and the second set of map features, respectively;
   determining, using the computer device, a first threshold density based on the first category and a second threshold density based on the second category, wherein the first threshold density is not equal to the second threshold density;
   determining, using the computer device, a first area of the map viewing window where the density of map features that belong to the first category are above the first threshold density and determining a second area of the map viewing window where the density of map features that belong to the second category are above the second threshold density;
   ranking, using the computer device, the first and the second area based on a density of the map features of the first category within the first area and a density of the map features of the second category within the second area; and
   assigning, using the computer device, a first modified style to the first area and a second modified style to the second area, wherein the first and the second modified style is assigned based on a prominence rating of the first and of the second modified style, wherein the prominence rating increases with increasing modified rank, providing access to map data including the first and the second area and the first and the second modified styles.

2. The method of claim 1, further including searching a plurality of metadata parameters associated with one of the plurality of map features for a third keyword that is common between the plurality of metadata parameters of the one map feature and determining a popularity rating of the one map feature based on the number of distinct metadata parameters containing the third keyword.

3. The method of claim 2, further including ranking the one map feature based on the popularity rating and assigning a modified third style to the one map feature based on the ranking and the popularity rating.

4. The method of claim 3, wherein the ranking of the one map feature is greater than the ranking of the first and of the second category and wherein the third style has a higher prominence than the first and the second styles.

5. The method of claim 3, wherein the one map feature belongs to the first category and wherein the third style assigned to the one map feature has a prominence rating higher than the first style.

6. The method of claim 1, wherein the first area represents a first road feature and the second area represents a second road feature and wherein the first and the second set of map features are point locations about the first and the second road feature, respectively.

7. The method of claim 1, wherein searching the metadata parameters for the first keyword and second keyword includes searching from a predetermined list of keywords that contain the first and the second keyword.

8. The method of claim 1, wherein the predetermined list of keywords is determined based on user input.

9. The method of claim 1, further including creating a first label indicating the first category and associating the first label with the first area.

10. The method of claim 1, further including ranking a third map feature, being a road feature, below the rank of the first and the second category when a density of map features belonging to the first or the second category about the third map feature is below the first and the second threshold densities and assigning a third modified style to the third map feature that has a lower prominence rating than the first and the second modified style.

11. A computer-implemented method of providing map data to a computer device comprising:

receiving, using the computer device, a set of metadata parameters associated with a set of map features for a map viewing window, wherein each of the set of map features has at least one associated metadata parameter of the set of metadata parameters;

searching, using the computer device, the set of metadata parameters of each of the set of map features for a keyword that is common between a plurality of the map features;

categorizing the plurality of map features having associated metadata parameters with the common keyword into a category of interest, wherein categorizing the plurality of map features includes associating a category identifier with the map features belonging to the category of interest;

determining an area of the map viewing window where the density of map features that belong to the category of interest is over a threshold density;

creating, using the computer, a mark of the determined area, including creating an area feature that corresponds to the determined area, wherein the area feature is assigned a style that is distinct from a map feature of an area outside the determined area;

providing, using the computer, access to map data including the mark and the determined area.

12. The method of claim 11, further including transmitting, using the computer device, map data including the set of map features and the created mark.

13. The method of claim 11, further including determining the threshold density based on the category of interest.

14. The method of claim 11, wherein searching the set of metadata parameters for the common keyword includes searching a predetermined list that contains the common keyword.

15. The method of claim 11, wherein the set of metadata parameters includes one of text labels associated with the set of map features, page place data, user click data, or a user input.

16. The method of claim 11, wherein creating the mark of the determined area includes creating a text label that indicates the common keyword and associating the text label with the determined area.

17. The method of claim 11, further including ranking the category of interest and assigning a style to the area feature that corresponds to the ranking of the category of interest.

18. The method of claim 17, further including ranking a map feature external to the determined area lower than a ranking of the category of interest and assigning a another style to the external map feature that has a lower degree of prominence than the style of the area feature.

19. The method of claim 11, wherein creating the mark of the determined area includes assigning a style parameter to at least one map feature within the determined area.

20. The method of claim 19, wherein assigning the style parameter includes modifying a text of a label associated with the at least one map feature to indicate the common keyword.

21. The method of claim 11, wherein determining the area includes determining an area about a road feature where a density of map features along the road feature that belong to the category of interest is over the threshold density, and wherein creating the mark of the determined area includes assigning a style parameter to the road feature.

22. The method of claim 21, wherein the style parameter assigned to the road feature has a higher degree of prominence than a previous style associated with the road feature before creating the mark of the determined area.

23. The method of claim 11, wherein one map feature of the set of map features is associated with a plurality of metadata parameters, and further including searching the plurality of metadata parameters of the one map feature for a keyword that is common between the plurality of metadata parameters of the one map feature and assigning a style parameter to the one map feature to indicate the common keyword.

24. The method of claim 23, wherein the one map feature is a location and wherein the plurality of metadata parameters includes a plurality of information on reviews of the location.

25. The method of claim 23, wherein the one map feature is a road and wherein the plurality of metadata parameters includes a plurality of reviews of locations about the road.

26. A computer device for processing map data, the computer device comprising:

a communications network interface;

one or more processors;

one or more memories coupled to the one or more processors;

a display device coupled to the one or more processors;
wherein the one or more memories include computer executable instructions stored therein that, when executed by the one or more processors, cause the one or more processors to:
  retrieve a plurality of map features for a map area, wherein each of the map features has at least one associated metadata parameter, wherein the metadata parameter includes text describing the map feature;
  search the metadata parameters associated with each of the set of map features for a keyword that is common between a set of the map features;
  categorize the set of map features into a category of interest by associating a category identifier with each of the set of map features;
  determine an area of the map about a road feature where a density of map features along the route feature that belong to the category of interest is above a first threshold density;
  rank the determined area based on the density of the map features of the category of interest within the first area;
  assign a modified style to the determined area based on a prominence rating of the modified style, including restyle the road feature, wherein the prominence rating increases with increasing modified rank; and
  provide access to map data that includes the determined area and first modified style.

27. The computer device of claim 26, wherein the computer executable instructions further cause the one or more processors to receive a request for responsive map data, wherein the request includes the common keyword.

28. The computer device of claim 26, wherein the computer executable instructions further cause the one or more processors to transmit map data including the determined area and the modified style via the network communications interface.

29. The computer device of claim 26, wherein the computer executable instructions further cause the one or more processors to retrieve the at least one associated metadata parameter and associate the at least one metadata parameter with a corresponding one of the plurality of map features.

30. The computer device of claim 29, wherein the at least one associated metadata parameter is retrieved from an external computer device via the network communications interface.

31. The computer device of claim 26, wherein the computer executable instructions further cause the one or more processors to render the determined area on a map viewing window on the display device using the modified style.

* * * * *